Patented Apr. 20, 1943

2,317,138

UNITED STATES PATENT OFFICE 2,317,138

GRANULAR POLYMERIZATION OF ETHANOID MONOMERS

David A. Fletcher, Bloomfield, N. J., assignor to E. I. du Pont de Nemours & Company, Wilmington, Del., a corporation of Delaware No Drawing. Application July 23, 1940, Serial No. 346,995

7 Claims. (Cl. 260—23)

This invention relates to the manufacture of molding compounds having an ethenoid resin base and, more particularly to the incorporation therein of lubricants for the purpose of preventing their adhesion to metal molds.

In the formulation of plastic molding compounds it is customary to incorporate therein small proportions of substances which serve to facilitate the removal of molded articles from molds by preventing the adhesion of the compound to molds. Such substances are designated "mold lubricants" or simply "lubricants."

The incorporation of lubricants in molding compounds having an ethenoid resin base, such as molding compounds comprising the polymers of methyl methacrylate and its homologues and interpolymers in which such polymers predominate, has given rise to certain difficulties. It is the preferred practice to produce these polymers by the so-called granulation process in which the material to be polymerized is suspended in the form of small droplets in an inert liquid, usually water, and polymerized therein so as to yield corresponding small globules or granules of polymer. Several different methods of effecting the incorporation of lubricant have heretofore been used.

One procedure is to select a lubricant which is soluble in the monomeric material, and to dissolve the lubricant in the monomer before subjecting the latter to polymerization. This procedure has been used without difficulty in the case of certain lubricants of neutral character, such as long-chain aliphatic alcohols, butyl stearate, ethyl palmitate, and natural waxes, which are, however, of only mediocre effectiveness as lubricants. With lubricants of acidic character this procedure gives rise to mechanical difficulties during the course of the polymerization, i. e., objectionable aggregation of the globules, or objectionable foaming of the aqueous vehicle, or both.

Another procedure defers the addition of the lubricant until after the completion of the polymerization. At this time, with the polymerization batch at a temperature higher than the melting point of the lubricant, the latter is added to the batch under vigorous agitation. By this means are obviated the two difficulties mentioned in the first described procedure but the deposition of the lubricant upon the globules of polymer is uncertain and incomplete; much of the lubricant is subsequently drained away with the water and only an uncertain fraction of it remains with the polymer.

Still another procedure defers the addition of the lubricant until the polymer in globular form has been dried, whereupon the lubricant is incorporated with it by kneading upon mixing rolls or their equivalent, conveniently at the same time at which color ingredients, if any, are to be incorporated. This procedure, carefully carried out, insures the presence of the desired proportion of lubricant in the compound and its proper distribution therein, but is a source of added expense. The rolling operation is complicated and prolonged by the lubricating effect of the lubricant thus added; the lubricating effect delaying the formation of a coherent mass which will adhere satisfactorily to the surface of the rolls and so become capable of being effectively kneaded. And if no other ingredient is to be incorporated, this procedure involves the addition of the step of rolling solely for the purpose of incorporating the lubricant.

An object of the present invention is to formulate and to produce molding compounds having an ethenoid resin base, particularly those having a base of polymers of methyl methacrylate and its homologues, or of copolymers in which these polymers are predominate components, which molding compounds are effectively lubricated so that they will not adhere to metal of molds in the course of ordinary molding operations. A further object of the invention is to provide a method whereby effective lubricants can be incorporated into molding compounds of this character without the difficulties above recounted, i. e., a method in which the process of polymerization is not complicated by aggregation of globules nor by foaming of the liquid vehicle, and in which the step of kneading on rolls is not delayed and prolonged by an unwanted lubricating effect. It is further an object of the invention to provide lubricants adapted to be incorporated without these difficulties and possessing properties desirable in a lubricant, namely, absence of deleterious effect upon the color, the transparency, and the homogeneity of articles molded from the resulting compound, effectiveness as lubricants when used in small proportions, and absence of appreciable depressing effect upon the softening temperature of these compounds. Other objects will be apparent from the description of the invention given hereinafter.

The above objects are accomplished according to the present invention by polymerizing an ethenoid monomer dispersed in water containing a dispersing agent and adding to the dispersion during the peak period of the polymerization reaction a lubricant selected from the group consisting of the saturated aliphatic acids containing 12–18 carbon atoms, inclusive, and the di- and tri-substituted esters of phosphoric acid with saturated aliphatic alcohols of 12–18 carbon atoms, inclusive.

Lubricants coming within the scope of the invention and yielding the desired results when used in the process of the invention will include saturated aliphatic acids containing 12–18 carbon atoms. Either the individual acids or mixtures thereof may be used. Examples of these acids are stearic acid, palmitic acid, myristic acid, and lauric acid. Stearic acid is preferred since it is the one most readily available commercially in colorless form, and least expensive in such form. Other lubricants suitable for use in this invention include di- and tri-substituted esters of phosphoric acid with saturated aliphatic alcohols of from 12–18 carbon atoms, and mixtures thereof. Since the di-substituted esters are more easily prepared than the tri-, they will be preferred. Dilauryl phosphate is a desirable example.

The amounts of such lubricants to be used will ordinarily not exceed 2 parts per 100 parts of monomer. All proportions throughout the specification and claims are given by weight unless otherwise stated.

The present invention is broadly applicable to ethenoid monomers, either taken singly or in admixture, which ethenoid monomers give polymers adapted for use in plastics molding operations. Obviously, the invention assumes greatest importance with respect to those ethenoid compounds which are most advantageously used in the granular polymerization process although other ethenoid compounds which heretofore have been polymerized by other methods, may more advantageously be polymerized in water suspension in view of the benefits deriving from this invention.

Methyl methacrylate monomer is an ethenoid monomer particularly adapted for use in the present invention and, likewise, mixtures of methyl methacrylate monomer with other monomers used in minor proportions, are well adapted for use in this invention. Other ethenoid monomers which may be used either alone or in admixture with each other or methyl methacrylate include vinyl acetate and other vinyl esters, styrene and its derivatives, and esters of acrylic and methacrylic acid and their derivatives.

There may be associated with the ethenoid monomer, at the start of the process, plasticizers selected and proportioned for their influence on the characteristics of the polymer which is to be made.

The amount of lubricant will be selected to meet the requirements of a given case as will be understood by those skilled in the art. For purposes of illustration only, the following may be stated as to the amounts to be used in parts per hundred parts of monomer:

With methyl methacrylate, unplasticized, the preferred amount is from 0.5 to 0.75 of one of the fatty acid lubricants or from 0.25 to 0.5 of one of the phosphate esters.

With plasticized methyl methacrylate, from 1.0 to 1.25 and from 0.75 to 1.0, respectively.

With the copolymer methyl methacrylate 90, styrene 10, from 1.0 to 1.25 and from 0.75 to 1.0, respectively.

With the copolymer methyl methacrylate 85, vinyl acetate 15, from 1.75 to 2.0 and from 1.25 to 1.5, respectively.

The general procedure of granulation polymerization, to which the present invention is applicable, is described in United States Patent 2,133,257 of D. E. Strain. In this procedure the monomeric liquid, either in admixture with plasticizer or not, has mixed with it a suitable proportion of a catalyst of polymerization, such as benzoyl peroxide, and is introduced into a larger volume of an inert liquid in which it is insoluble, ordinarily water, which serves as the vehicle. This vehicle has dissolved in it a sufficient quantity of a dispersing agent so that when the mixture is maintained under active agitation the monomeric liquid is maintained in the form of tiny droplets suspended in the vehicle. Polymerization is now effected by heating, preferably by the circulation of hot water through a jacket surrounding the container in which the batch has been mixed. A reflux condenser is attached to the container for the return of vaporized monomer and water. The reaction of polymerization is an exothermic one and it is ordinarily preferred to ensure the absorption of the excess heat by the provision of a generous circulation of water at the desired temperature in the jacket. This or other means of moderating the temperature of the batch is desirable, even though not essential, in connection with the present invention.

Under the preferred conditions described, the temperature of the mixture, as indicated by a thermometer immersed therein, remains substantially constant during the early stages of the reaction of polymerization. Subsequently, however, heat is produced by the reaction at a greater rate with the result that, in spite of the moderating influence of the water jacket, the temperature of the reaction batch rather suddenly rises, going within a few minutes to a peak value and then, immediately or very soon, decreasing again rather rapidly to or toward the initial level. The temperature then remains at the new level until polymerization has been substantially completed when the temperature again decreases to that of the surrounding water jacket.

For purposes of the present invention, the time during which the evolution of heat is at its maximum, which time may be very brief and is usually not more than a minute or two, will be referred to as the peak of the polymerization reaction, while the period during which occur the abrupt rise to the peak, the peak itself, and the rapid fall thereafter will be referred to as the peak period.

The abrupt rise of temperature marking the beginning of the peak period, and the level of temperature reached at the peak, can be moderated by temporarily increasing the rate of circulation of the cooling water, or by decreasing its temperature, but the fact that the characteristic rise in temperature may be obscured by such measures does not do away with the occurrence of the peak and does not reduce its significance in relation to the present invention. It is to be noted also that such partial suppression of the rise in temperature tends to lengthen the peak period.

The present invention is based upon the discovery that the objects are accomplished if any of the herein considered lubricants is added to the reaction batch within the peak period of the polymerization reaction and, preferably, as near the peak of the reaction as possible.

The postponement of the addition of the lubricant until this time is found to obviate the mechanical difficulties which, as already described, have been observed when these lubricants are incorporated with the monomer at the beginning of the reaction of polymerization. These difficulties do not arise subsequently to the peak period.

It has been found by actual analysis that when the herein considered lubricants are added to the reaction batch during the peak period, and preferably at the peak itself, practically the entire amount thus added, which is of the order of two per cent or less of the weight of the initial monomer, is taken up by the material undergoing polymerization. Thus there are avoided the waste and uncertainty of lubricating effect which result if the lubricant is added after the completion of the polymerization.

There is also evidence, based upon suitable analytical procedure, that the lubricant is distributed almost entirely upon the surfaces of the globules, or at least that it penetrates the latter only very slightly. If the polymer is to be used in its globular granular form for molding, without an intermediate treatment upon mixing rolls or the like for the incorporation of auxiliary ingredients, it is evident that this location of the lubricant upon the surfaces of the granules is desirable in promoting an optimum of lubricating effect in the molds since it is only at the surfaces of such globules coming into contact with the metal of the molds that lubricating action is required.

This distribution of the lubricant upon the globules is different, however, from that which might be obtained by tumbling together a dry, unlubricated polymer with an equivalent amount of lubricant, as a means of causing the former to be coated by the latter. Polymer coated in this latter manner gives, when molded, a molded mass of granular character, i. e., one in which the shape of the granules from which it has been molded tends to persist in the form of a slight optical non-homogeneity. Articles molded from polymer lubricated in accordance with the present invention are not only free from these evidences of non-homogeneity but actually have a more limpid and brighter appearance than articles made from completely unlubricated polymer.

If it is desired to compound the granular polymer with auxiliary ingredients, particularly coloring ingredients, by kneading on mixing rolls, or in other suitable equipment, the polymer lubricated in accordance with the present invention is handled without difficulty. Having once been separated from the vehicle and dried, the granules weld together readily on hot rolls, yielding a continuous mass which does not drop from the rolls. The rolling operation is, accordingly, carried out as readily and as rapidly as though no lubricant were present.

The following examples are given to illustrate specific embodiments of the present invention:

*Example I.*—An aqueous vehicle is made up of:

| | Parts |
|---|---|
| Distilled water | 2000 |
| Na₂HPO₄.12H₂O | 9.5 |
| NaH₂PO₄.2H₂O | 0.5 |
| Granulating agent | 1.0 |

The granulating agent is a partially neutralized polymethacrylic acid and is furnished in dilute aqueous solution, the water content of which is included in the amount of water stated.

In a jacketed kettle equipped with agitator and reflux condenser there are introduced into this vehicle

| | Parts |
|---|---|
| Methyl methacrylate monomer | 1000 |
| Benzoyl peroxide | 8.0 |

While maintaining the jacket temperature at 86° C., the mixture is rapidly agitated. The monomer is thereby suspended in the form of tiny droplets in the vehicle.

In about 40 minutes the temperature of the mixture rises from that of reflux (about 83° C.) to about 88° C. to 91° C. At this point, there is added to the mixture:

| | Parts |
|---|---|
| Stearic acid | 5 | in the form of a melted slurry in a little hot water.

Within a very few minutes after rising to a peak, the temperature falls gradually to about 86° C. Fifteen minutes after the occurrence of the peak, the circulation of hot water in the jacket is replaced by circulation of cold water. When the batch has thereby been cooled to about 35° C., the finely divided polymer is separated in a centrifuge, washed three times with distilled water, and then dried at 70° C. for about 24 hours.

This polymer can be molded by compression in an unlubricated mold and does not adhere to the mold. The molded article is transparent and brilliant, comparatively free of graininess, and not inferior in finish to the mold in which it is made.

*Example II.*—Into the aqueous vehicle of Example I is introduced a mixture of:

| | Parts |
|---|---|
| Methyl methacrylate monomer | 1000 |
| Benzoyl peroxide | 8 |

Polymerization is effected as in Example I. Immediately following the peak of the reaction there is added, suspended in a little hot water,

| | Parts |
|---|---|
| Dilauryl phosphate | 2.5 |

Subsequent procedure is as in Example I.

*Example III.*—Into the aqueous vehicle of Example I is introduced a mixture of:

| | Parts |
|---|---|
| Methyl methacrylate monomer | 900 |
| Styrene monomer | 100 |
| Benzoyl peroxide | 20 |

Polymerization is effected, by the application of heat, in a jacketed reflux kettle. At the peak of the reaction there is added:

| | Parts |
|---|---|
| Stearic acid | 10 |

The subsequent procedure is as in Example I.

*Example IV.*—The procedure of Example III was followed using a mixture of:

| | Parts |
|---|---|
| Methyl methacrylate monomer | 800 |
| Methyl acrylate monomer | 200 | with

| | Parts |
|---|---|
| Benzoyl peroxide | 10 | as catalyst.

*Example V.*—The procedure of Example I is followed in the polymerization of a mixture of:

| | Parts |
|---|---|
| Methyl methacrylate monomer | 850 |
| Vinyl acetate monomer | 150 | with

| | Parts |
|---|---|
| Benzoyl peroxide | 20 | as catalyst. At the peak of the reaction is added:

| | Parts |
|---|---|
| Stearic acid | 5 |

The dried polymer is compounded on hot rolls with:

| | Parts |
|---|---|
| Cadmium yellow No. 4 | 6 | and the resulting dough is cooled and ground.

*Example VI.*—The procedure of Example III was followed using a mixture of:

| | Parts |
|---|---|
| Methyl methacrylate monomer | 880 |
| Vinyl acetate monomer | 120 |
| with | |
| Benzoyl peroxide | 20 | as catalyst, except that 10 parts of dimyristyl phosphate was used in place of the stearic acid as lubricant.

*Example VII.*—The procedure of Example III was again followed but using a mixture of:

| | Parts |
|---|---|
| Methyl methacrylate monomer | 900 |
| Styrene monomer | 100 |
| with | |
| Benzoyl peroxide | 20 | as catalyst and using 5 parts of distearyl phosphate in place of the stearic acid as lubricant.

*Example VIII.*—Into the aqueous vehicle of Example I is introduced a mixture of:

| | Parts |
|---|---|
| Methyl methacrylate monomer | 900 |
| Diamyl phthalate (plasticizer) | 100 |
| Benzoyl peroxide | 7.7 |

Polymerization of the monomer is effected in the manner described in Example I. Immediately following the occurrence of the peak of the reaction there is added, in molten condition, suspended in a little hot water,

| | Parts |
|---|---|
| Palmitic acid | 20 |

The balance of the procedure is as in Example I.

*Example IX.*—The procedure of Example I is carried out except that the amount of stearic acid added is 20 grams.

Following the drying, the resulting lubricated polymer is compounded on hot mixing rolls with dibutyl phthalate, 110 parts, and the resulting dough is cooled and ground.

*Example X.*—The procedure of Example III was followed using a mixture of:

| | Parts |
|---|---|
| Methyl methacrylate monomer | 950 |
| Diamyl phthalate (plasticizer) | 50 |
| with Benzoyl peroxide | 8 | as catalyst, except that 14 parts of myristic acid was used in place of the stearic acid as lubricant.

It will be understood that the above examples are merely illustrative and that the invention is applicable to the ethenoid monomers adapted for use in plastics molding procedures whether used alone or in admixture. The coloring matter, plasticizer, and catalyst specified in the examples, as well as modifiers generally, may be replaced with others without any particular regard to the present invention.

The present invention provides a simple and inexpensive procedure for the addition of lubricant in the course of the manufacture of polymethyl methacrylate and the like. It involves no complications in operating procedure and in many cases eliminates the necessity of a kneading operation, thereby reducing operating cost. The resulting products are effectively lubricated for molding and are not injured in any respect by the presence of the lubricating substance. On the contrary, the invention tends to improve the quality of the molded articles, as regards homogeneity and clearness.

As many apparently widely different embodiments of this invention may be made without departing from the spirit and scope thereof, it is to be understood that the invention is not limited to the specific embodiments thereof except as defined in the appended claims.

I claim:

1. In the granular polymerization of an ethenoid monomer from the group consisting of vinyl esters, styrene, and esters of acrylic and methacrylic acids, the steps comprising dispersing said ethenoid monomer in water containing a dispersing agent, initiating polymerization of said monomer, and adding to said dispersion during the peak period of the evolution of heat by the polymerization reaction a lubricant of acidic character from the group consisting of the saturated aliphatic acids containing 12–18 carbon atoms, inclusive.

2. In the granular polymerization of an ethenoid monomer from the group consisting of vinyl esters, styrene, and esters of acrylic and methacrylic acids, the steps comprising dispersing said ethenoid monomer in water containing a dispersing agent, initiating polymerization of said monomer, and adding to said dispersion during the peak period of the evolution of heat by the polymerization reaction up to 2.0 parts, per 100 parts of said monomer, of a lubricant of acidic characted from the group consisting of the saturated aliphatic acids containing 12–18 carbon atoms, inclusive.

3. In the granular polymerization of methyl methacrylate monomer, the steps comprising dispersing said methyl methacrylate monomer in water containing a dispersing agent, initiating polymerization of said monomer, and adding to said dispersion during the peak period of the evolution of heat by the polymerization reaction a lubricant of acidic character from the group consisting of the saturated aliphatic acids containing 12–18 carbon atoms, inclusive.

4. In the granular polymerization of methyl methacrylate monomer, the steps comprising dispersing said methyl methacrylate monomer in water containing a dispersing agent, initiating polymerization of said monomer, and adding to said dispersion during the peak period of the evolution of heat by the polymerization reaction up to 2.0 parts, per 100 parts of said monomer, of a lubricant of acidic character from the group consisting of the aliphatic acids containing 12–18 carbon atoms, inclusive.

5. In the granular polymerization of a mixture of ethenoid monomers from the group consisting of vinyl esters, styrene, and esters of acrylic and methacrylic acids, of which mixture at least a major portion is methyl methacrylate, the steps dispersing said mixture of ethenoid monomers in water containing a dispersing agent, initiating polymerization of said monomers, and adding to said dispersion during the peak period of the evolution of heat by the polymerization reaction a lubricant of acidic character from the group consisting of the saturated aliphatic acids containing 12–18 carbon atoms, inclusive.

6. In the granular polymerization of a mixture of ethenoid monomers from the group consisting of vinyl esters, styrene, and esters of acrylic and methacrylic acids, of which mixture at least a major portion is methyl methacrylate, the steps dispersing said mixture of ethenoid monomers in water containing a dispersing agent, initiating polymerization of said monomers, and adding to said dispersion during the peak period of the evolution of heat by the polymerization reaction up to 2.0 parts, per 100 parts of said mixture of monomers, of a lubricant of acidic character from the group consisting of the saturated aliphatic acids containing 12–18 carbon atoms, inclusive.

7. In the granular polymerization of a mixture of ethenoid monomers from the group consisting of vinyl esters, styrene, and esters of acrylic and methacrylic acids, of which mixture at least a major portion is methyl methacrylate, the steps comprising dispersing said mixture of ethenoid monomers in water containing a dispersing agent, initiating polymerization of said monomers, and adding to said dispersion during the peak period of the evolution of heat by the polymerization reaction stearic acid as a lubricant.

DAVID A. FLETCHER.